US011155894B2

(12) United States Patent
Berezowsky et al.

(10) Patent No.: US 11,155,894 B2
(45) Date of Patent: *Oct. 26, 2021

(54) METHOD FOR REDUCING ARSENIC CONTENT IN ARSENIC-BEARING GOLD MATERIAL

(71) Applicant: Eldorado Gold Corporation, Vancouver (CA)

(72) Inventors: Roman Berezowsky, St. Albert (CA); Paul Skayman, Vancouver (CA); Jinxing Ji, Burnaby (CA)

(73) Assignee: Eldorado Gold Corporation, Vancouver (CA)

( * ) Notice: Subject to any disclaimer, the term of this patent is extended or adjusted under 35 U.S.C. 154(b) by 540 days.

This patent is subject to a terminal disclaimer.

(21) Appl. No.: 15/761,025

(22) PCT Filed: Apr. 28, 2016

(86) PCT No.: PCT/CA2016/000128
§ 371 (c)(1),
(2) Date: Mar. 16, 2018

(87) PCT Pub. No.: WO2017/185158
PCT Pub. Date: Nov. 2, 2017

(65) Prior Publication Data
US 2018/0258510 A1    Sep. 13, 2018

(51) Int. Cl.
*C22B 1/11*    (2006.01)
*C22B 3/22*    (2006.01)
(Continued)

(52) U.S. Cl.
CPC .................. *C22B 1/11* (2013.01); *C22B 3/08* (2013.01); *C22B 3/22* (2013.01); *C22B 3/44* (2013.01);
(Continued)

(58) Field of Classification Search
CPC .. C22B 1/11; C22B 3/08; C22B 11/00; C22B 11/04; C22B 3/22; C22B 3/44; C22B 30/04; Y02P 10/234
See application file for complete search history.

(56) References Cited

U.S. PATENT DOCUMENTS 4,572,822 A      2/1986  Abe et al.
2004/0197249 A1* 10/2004  Wan ........................ C22B 11/08
                                              423/29

(Continued)

FOREIGN PATENT DOCUMENTS

CA      2016640 A1   11/1990
WO   2014056034 A1    4/2014

OTHER PUBLICATIONS

Kim, D. J.; Pitchimani, R.; Snow, D. E.; Hope-Weeks, L. "A Simple Method for the Removal of Thiols on Gold Surfaces Using an NH4OH—H2O2—H2O Solution" J. Scanning 2008, 30, 118-122 (Year: 2008).*

(Continued)

*Primary Examiner* — Duane Smith
*Assistant Examiner* — Sean P. O'Keefe
(74) *Attorney, Agent, or Firm* — McCoy Russell LLP

(57) ABSTRACT

A process for reducing arsenic content from arsenic-bearing gold concentrate or other arsenic-bearing gold materials to produce a low arsenic-bearing gold concentrate. The process may comprise adding oxygen, water, and/or acid to an acidulated arsenic-bearing gold concentrate slurry and reacting them together in an autoclave at an elevated pressure and temperature in a pressure oxidation step. In one or more examples, the process may further comprise processing the oxidized concentrate slurry in an arsenic re-dissolution step to dissolve unstable solid arsenic compounds, and applying a first solid/liquid separation and wash step to form a first washed slurry/solid and first acid-containing solutions. The (Continued)

process may further comprise reacting the first washed slurry/solid with sulfur dioxide in a reductive leach step, and applying a second solid/liquid separation and wash step to form a second washed slurry/solid and second acid-containing solutions. The second washed slurry/solid may be a low arsenic-bearing gold concentrate.

19 Claims, 1 Drawing Sheet

(51) Int. Cl.
  C22B 3/44   (2006.01)
  C22B 11/00  (2006.01)
  C22B 3/08   (2006.01)
  C22B 30/04  (2006.01)
(52) U.S. Cl.
  CPC .............. *C22B 11/00* (2013.01); *C22B 11/04* (2013.01); *C22B 30/04* (2013.01); *Y02P 10/20* (2015.11)

(56) References Cited

U.S. PATENT DOCUMENTS

2005/0217422 A1* 10/2005 Makinen ................ C22B 11/04
                                                   75/10.35
2014/0262814 A1*  9/2014 Goel .......................... C25C 7/06
                                                   205/548

OTHER PUBLICATIONS

Lei, K. P. V.; Carnahan, T. G. "Silver-catalyzed oxidative leaching of an arsenical copper sulfide concentrate" Bur. Mines Rep. Invest., 9122 (1987)) (Year: 1987).*

ISA Canadian Intellectual Property Office, International Search Report Issued in Application No. PCT/CA2016/000128, dated Dec. 14, 2016, WIPO, 2 pages.

* cited by examiner

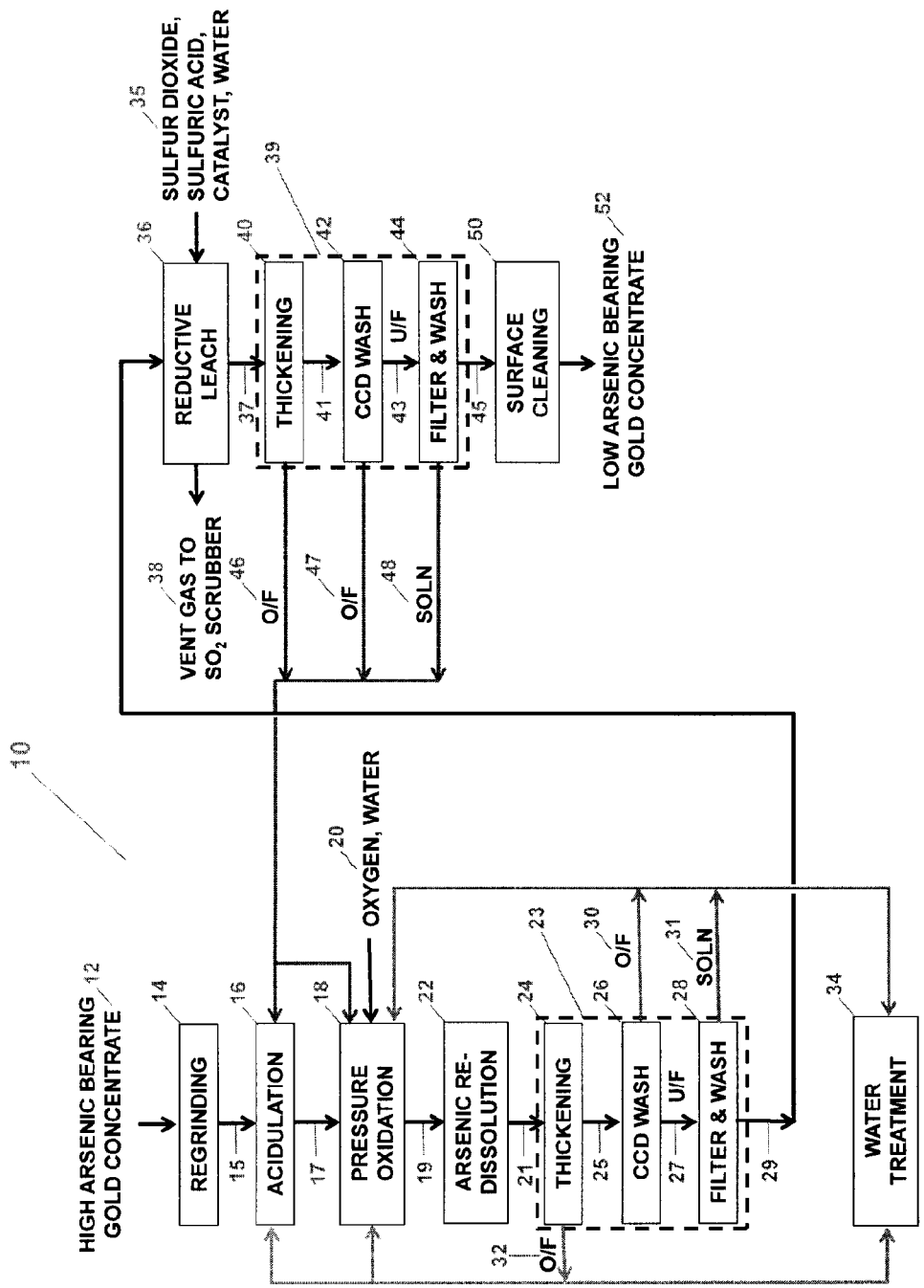

METHOD FOR REDUCING ARSENIC CONTENT IN ARSENIC-BEARING GOLD MATERIAL

CROSS-REFERENCE TO RELATED APPLICATIONS

The present application is a U.S. National Phase of International Patent Application Serial No. PCT/CA2016/000128 entitled "METHOD FOR REDUCING ARSENIC CONTENT IN ARSENIC-BEARING GOLD MATERIAL," filed on Apr. 28, 2016. The entire contents of the above-cited application is hereby incorporated by reference in its entirety for all purposes.

FIELD OF THE INVENTION

The present invention relates to methods for the removal of arsenic from arsenic-bearing gold material. More particularly, the present invention relates to a process for treating arsenic-bearing gold material, such as gold concentrate, gold/silver concentrate or gold/copper concentrate from mining operations.

BACKGROUND OF THE INVENTION

Gold occurs naturally principally as native metal, often alloyed with silver (as electrum) or with mercury (as amalgam), and sometimes as solid solution in sulfide minerals, such as mainly with arsenopyrite and pyrite, and in minor or trace amounts with pyrrhotite, chalcopyrite, sphalerite and galena. Native gold can occur as nuggets, as fine grains or flakes in alluvial deposits, or as grains embedded in other rocks. Gold extraction or the recovery of gold from its ores may involve various processing techniques which are performed on the ore or the resultant concentrate, including: comminution (e.g. crushing, grinding); mineral processing (e.g. gravity concentration and flotation); hydrometallurgical processing (e.g. pressure oxidation and cyanidation); and pyrometallurgical processing (e.g. roasting and smelting). Conventional processing techniques for sulfide refractory gold ores can include crushing, grinding, gravity concentration, flotation, roasting, biological oxidation or pressure oxidation prior to gold leaching using cyanide (cyanidation).

When gold is present as solid solution within sulfide minerals such as pyrite or arsenopyrite, a concentration step known as froth flotation is often applied to the mined ore to increase gold grade (to improve economics of downstream operations or concentrate sales), or to increase sulfur grade as required by downstream processes, or to reject carbonates and other deleterious elements, or to generate tailing for backfill, etc. When gold bearing sulfide minerals do not float well, the froth flotation is often omitted, and the ore is treated directly.

As used herein, "concentrate" can generally refer to the flotation concentrate, the gravity concentrate, or the ore after oxidation, dissolution, leaching or any pre-treatment, or any solid product from combinations of the foregoing pre-treatments.

The gold concentrate produced from some mines may have a relatively high level of arsenic. For example, it is not unusual for some mines to produce gold concentrate which contains approximately 8-16% arsenic by weight. Such a high level of arsenic in the gold concentrate is generally very undesirable for a number of reasons.

For example, arsenic presents a number of environmental concerns. Arsenic is generally viewed as a pollutant, which can be toxic and/or a carcinogen if it gets into water sources and is ingested. When there is a high level of arsenic in the gold concentrate, it is more difficult and/or expensive to control the emission/release of arsenic (e.g. in the form of gas/dust/solution) during subsequent pyrometallurgical gold extraction processes and hence the processing risks associated therewith are greater. In any event, gold concentrate with a high level of arsenic can lead to cost implications and processing complications.

It naturally follows that the amount of arsenic in the gold concentrate is a significant factor in assessing the value of such concentrate. This is particularly relevant where the gold concentrate is sold/supplied to other parties to carry out the gold extraction and further processing/refinement. Under current market practices, for gold concentrate that is sold/supplied to others, often there is a very low penalty-free threshold with respect to arsenic. Such a penalty-free threshold may be, say, 0.5% by weight of arsenic. When gold concentrate is supplied with arsenic content that is higher than the penalty-free threshold, significant penalty charges may be imposed on the balance above the applicable threshold. Multiple thresholds and penalties may also be applicable. In some situations, a shipment of gold concentrate may be rejected entirely if it contains arsenic above a certain level. It is probable that the quality standards for such concentrates will only become more demanding over time, due to environmental and other concerns.

Furthermore, there are advantages in being able to provide a process which, in addition to reducing the arsenic content, can also produce a significant mass reduction in the concentrate material. The removal of certain compounds from the concentrate can lead to improved processing efficiencies, since less material needs to be transported for further processing (this can be particularly significant if the concentrate is being supplied to others for further processing) and less material itself has to be further processed.

It is an object of the present invention to provide a process for reducing the arsenic content in arsenic-bearing gold materials.

BRIEF SUMMARY OF THE INVENTION

We shall describe the present invention in the context of processing of gold concentrate, although it should be understood that the disclosed process may also be applied to the processing of arsenic-bearing gold/copper concentrate or any other arsenic-bearing gold materials.

Disclosed herein is a process by means of which the amount of arsenic may be reduced from arsenic-bearing gold concentrate or other arsenic-bearing gold materials.

The disclosed process comprises several basic steps (such as regrinding, acidulation, pressure oxidation, solid/liquid separation and washing, and reductive leaching, etc.) that may be included among some of the processing steps in which gold concentrate is processed/concentrated into a more concentrated form. The input for the subject process is typically an arsenic-bearing gold concentrate (which generally speaking is a gold concentrate that has been extracted from a gold mine, and which may or may not have undergone some pre-treatment in the form of froth flotation or gravity concentration, but which generally has not yet been subject to hydrometallurgical, biological or pyrometallurgical processing).

The disclosed process comprises: (i) optionally regrinding the input arsenic-bearing gold concentrate; (ii) optionally treating the reground gold concentrate in an acidulation step; (iii) processing the concentrate through a pressure oxidation step; (iv) applying an arsenic re-dissolution step; (v) applying a first solid/liquid separation and wash step; (vi) applying a reductive leach step to the underflow (solid) from the first solid/liquid separation and wash step; (vii) applying a second solid/liquid separation and wash step; and (viii) applying an optional surface cleaning step, to produce low arsenic-bearing gold concentrate.

BRIEF DESCRIPTION OF THE DRAWINGS

Embodiments of the present invention are described below with reference to the accompanying drawings in which:

FIG. 1 is a simplified flowchart illustrating the process in accordance with one aspect of the present invention.

DETAILED DESCRIPTION OF THE INVENTION

The present invention now will be described more fully hereinafter with reference to the accompanying drawing(s), which form a part hereof, and which show, by way of illustration, exemplary embodiments by which the invention may be practiced. The invention may, however, be embodied in many different forms and should not be construed as limited to the embodiments set forth herein; rather, these embodiments are provided so that this disclosure will be thorough and complete, and will fully convey the scope of the invention to those skilled in the art. The following detailed description is, therefore, not to be taken in a limiting sense.

Referring to FIG. 1, this is a simplified flowchart setting out an exemplary method and process 10 for the reduction of arsenic content from arsenic-bearing gold concentrate. The disclosed process comprises: (i) optionally regrinding the input arsenic-bearing gold concentrate; (ii) optionally treating the reground gold concentrate in an acidulation step; (iii) processing the concentrate through a pressure oxidation step; (iv) applying an arsenic re-dissolution step; (v) applying a first solid/liquid separation and wash step; (vi) applying a reductive leach step to the underflow (solid) from the first solid/liquid separation and wash step; (vii) applying a second solid/liquid separation and wash step; and (viii) optionally applying a surface cleaning step, to produce low arsenic-bearing gold concentrate.

The initial input for the subject process is an arsenic-bearing gold concentrate 12. The gold concentrate 12 may be produced by froth flotation or gravity concentration from gold ore. For present purposes, the gold concentrate contains a relatively high level of arsenic content, which can mean approximately 8-16% by weight, although it is to be understood that the present invention can also be applied where the level of arsenic is lower or higher than this, where it is nevertheless desirable to reduce such levels of arsenic content in the gold concentrate. Preferably, the input gold concentrate has already undergone some pre-processing or concentration before it arrives at this input stage, in which case it is generally in the form of an aqueous slurry or moist filter cake. For example, froth flotation techniques (and/or other applicable gravity concentration techniques) may have been applied to concentrate the gold (particularly in the case of gold concentrate where the gold is closely associated with sulfide minerals such as mainly with pyrite and/or arsenopyrite, and in minor or trace amounts with pyrrhotite, chalcopyrite, sphalerite and galena). It should be understood, however, that the subject process could also be applied where freshly mined gold ore is the initial input.

Where appropriate, the input gold concentrate 12 undergoes mechanical regrinding (step 14) to form a reground gold concentrate slurry 15. The extent of such regrinding required, and whether it is necessary at all, will depend on the state of the input gold concentrate material. For example, it may already have undergone some degree of grinding during the above mentioned pre-processing, in which case, little or no further regrinding may be necessary. The main purpose of this regrinding step is simply to adequately break down the gold concentrate particles into smaller pieces, so that it has a greater surface area, in order to facilitate the further processing steps.

The gold concentrate 12 or the reground gold concentrate 15, as the case may be, (either of which is typically in the form of an aqueous slurry) is then treated with acid in an acidulation step 16 to form an acidulated concentrate slurry 17. The acid used is preferably either concentrated sulfuric acid or an aqueous sulfuric acid solution. The acid generally serves to react with and break down the carbonates in the gold concentrate to form carbon dioxide ($CO_2$), which can then be removed in the form of $CO_2$ gas, so that oxygen utilization during subsequent pressure oxidation (described later) is improved. In addition, acidulation (step 16) also increases the acidity of the slurries (17 and 19), which destabilizes the solid arsenic compounds formed during subsequent pressure oxidation (step 18) and arsenic re-dissolution (step 22), so that a larger solid mass reduction can be achieved. Acidulation (step 16) is normally carried out in one or multiple stirred tanks at ambient pressure for one or a few hours.

One of the objectives, of using acid and dissolved metals (such as dissolved ferric sulfate) during the acidulation step 16, is to make the solid compounds formed during the pressure oxidation step 18 unstable, so that mass reduction of the solid phase and solubilization of arsenic can be maximized in the ensuing pressure oxidation step 18 and subsequent arsenic re-dissolution step 22. This objective is counterintuitive to what is typically desired in the mining industry as a whole when utilizing comparable pressure oxidation steps; in those situations, the general objective is to form the most stable solid compounds during pressure oxidation (particularly when processing arsenic-bearing materials). The purpose of the acidulation step 16 in the disclosed process, besides adding extra acid for the subsequent pressure oxidation step 18, is to maximise the instability of the solid compounds, and to dissolve and keep as much arsenic in solution as possible.

For greater operational efficiency and flexibility, it is contemplated that, as shown in FIG. 1, acid-containing solutions from other parts of the process (i.e. the acid-containing solutions from downstream steps such as 30, 31, 32, 46, 47 and/or 48) may be recycled for this acidulation step 16. When appropriate, cooling may be applied to these warm/hot solution streams before recycling. The extent of recycling of the acid-containing solutions streams 30, 31 and 32 to the acidulation step 16 can be as needed, and can vary from 0% to nearly 100%. These acid-containing solutions may also contain, besides the acid itself, dissolved arsenic (e.g. in the form of arsenite and/or arsenate), dissolved iron (e.g. in the form of ferrous and/or ferric) and dissolved sulfate salts, etc. For example, the acid-containing solution can either be substantially free of solids (such as the overflow stream 32 from the thickening step (step 24) described below or it can contain solids, (such as the oxidized concentrate slurry 19 from the autoclave discharge, the re-dissolved slurry 21 after arsenic re-dissolution (step 22) or the underflow stream of thickened oxidized concentrate slurry 25 from the thickening step 24, etc.). For the purpose of destabilizing the solid arsenic compounds formed during pressure oxidation (step 18), the amount of solid arsenic compounds in the recycled stream should be minimized. Besides free acid (sulfuric acid), acid can also come from the hydrolysis of dissolved metals such as ferric iron. The contained solids in the recycled stream tend to serve as seeding material which is helpful to the reaction rates, to the stability of the solid compounds and to the mitigation of scale formation inside the autoclave.

The acidulated concentrate slurry 17 is then fed into a pressure oxidation vessel or autoclave and subjected to a pressure oxidation step 18. Oxygen and, if required for temperature control, water are added (step 20) to the autoclave. In a preferred embodiment, and as shown in FIG. 1, the overflow/filtrate streams of acid-containing solutions from downstream steps (30, 31, 32, 46, 47, 48), as needed, may also be recycled and added to the autoclave. When appropriate, cooling may be applied to these hot/warm solution streams before recycling. The contents of the autoclave are reacted together to oxidize the sulfide minerals therein under elevated pressure and temperature conditions (sometimes referred to herein as an oxidizing pressure and an oxidizing temperature, respectively) to form an oxidized concentrate slurry 19.

The reaction conditions for this pressure oxidation step 18 are preferably: from about 200 to about 240° C.; from about 200 to about 600 psig total pressure; from about 15 to about 250 psi oxygen partial pressure; from about 30 to about 120 minutes retention time. More preferably, the reaction conditions for the pressure oxidation step are: from about 220 to about 230° C.; from about 430 to about 530 psig total pressure; from about 25 to about 100 psi oxygen partial pressure; and from about 60 to about 90 minutes retention time.

Arsenic in the acidulated concentrate slurry 17 is oxidized and dissolved. While some of the dissolved arsenic remains soluble in solution, the remaining dissolved arsenic in solution is converted to solid arsenic compounds. Where applicable, recycling of part or all of the one or more of the acid-containing solutions from the overflow streams (30, 32) and from the filtrate stream (31), to either or both of the acidulation step 16 and the pressure oxidation step 18 makes the solid arsenic compounds unstable. The arsenic in solution and in solid after pressure oxidation may generally be in pentavalent form ($As^{5+}$).

During pressure oxidation (step 18), sulfide minerals are oxidized to various compounds. For instance, sphalerite (ZnS) is oxidized to zinc sulfate ($ZnSO_4$) in solution. Chalcopyrite ($CuFeS_2$) is oxidized to copper sulfate ($CuSO_4$) in solution, sulfuric acid ($H_2SO_4$) and iron compounds including hematite ($Fe_2O_3$), jarosite [$MFe_3(OH)_6(SO_4)_2$] and/or basic ferric sulfate ($FeOHSO_4$) in the solid, plus the formation of dissolved ferrous iron sulfate ($FeSO_4$) and dissolved ferric iron sulfate [$Fe_2(SO_4)_3$] in solution. Galena (PbS) is oxidized to form insoluble lead sulfate ($PbSO_4$) and/or insoluble lead jarosite (plumbojarosite) [$Pb_{0.5}Fe_3(OH)_6(SO_4)_2$]. Depending on pH and temperature conditions, oxidation of pyrite ($FeS_2$) can lead to formation of hematite ($Fe_2O_3$), jarosite [$MFe_3(OH)_6(SO_4)_2$] and/or basic ferric sulfate ($FeOHSO_4$) in the solid, plus the formation of sulfuric acid, dissolved ferrous iron sulfate ($FeSO_4$) and dissolved ferric iron sulfate ($Fe_2(SO_4)_3$) in solution. For the maximum solid weight loss, the formation of basic ferric sulfate ($FeOHSO_4$) should be facilitated during pressure oxidation.

Oxidation of arsenopyrite (FeAsS) during pressure oxidation can result in a series of solid compounds in addition to the formation of sulfuric acid, soluble trivalent arsenic and pentavalent arsenic in solution. The solid arsenic compounds can be the simple scorodite $FeAsO_4.2H_2O$ or more complicated basic iron arsenate sulfate $Fe_x(OH)_y(SO_4)_z(AsO_4)_m.nH_2O$. For the maximum solid weight loss and maximum re-dissolution of arsenic solid compounds, the formation of basic iron arsenate sulfate $Fe_x(OH)_y(SO_4)_z(AsO_4)_m.nH_2O$ should be facilitated during pressure oxidation.

As shown in the preferred embodiment of FIG. 1, it is contemplated that the subject process should preferably include a separate acidulation step 16 (for the reasons previously described), before the slurry is subject to the subsequent pressure oxidation step 18. However, it is to be understood that acidulation may to some extent occur as part of or in combination with the pressure oxidation step (given that the pressure oxidation step generally takes place under acidic condition); as such the separate acidulation step 16 may be regarded as optional.

The oxidized concentrate slurry 19 is then subjected to an arsenic re-dissolution step 22, wherein the oxidized concentrate slurry 19 is discharged from the autoclave and maintained for several hours at a temperature in the range of from about 50 to about 100° C. (the upper limit of the range being at or near the boiling point of water) and at ambient pressure, to form a re-dissolved slurry 21; most preferably, the temperature at which the oxidized concentrate slurry 19 is maintained at is ~95° C. As the oxidized concentrate slurry 19 is discharged from the autoclave, there is a reduction in pressure and temperature. This causes the majority of the unstable solid arsenic compounds to go back into solution.

The re-dissolved slurry 21 is then subjected to a first solid/liquid separation and wash step 23. When appropriate, cooling may be applied to the hot slurry before this first solid/liquid separation and wash step 23. This step comprises at least one of several conventional techniques for facilitating the separation of a slurry into solids and a solution, and for washing of the resultant solids. The first solid/liquid separation and wash step 23 can include at least one or a combination of: a thickening step; a counter current decantation (CCD) step; and a filter and wash step. Optionally, re-pulping of the filter cake may be included as well between filtrations to further improve wash efficiency.

In a preferred embodiment, as shown in FIG. 1, the first solid/liquid separation and wash step 23 comprises: a thickening step 24; a CCD wash step 26; and a filter and wash step 28. In the thickening step 24, the re-dissolved slurry 21 is thickened to form a thickened oxidized concentrate slurry 25 and an overflow stream of acid-containing solution 32 comprising a solution of acid and dissolved metal sulfates/arsenates. The thickening step 24 improves the wash efficiency of the subsequent CCD wash step (step 26) and also recovers a portion of relatively concentrated solution of acid and dissolved metal sulfates/arsenates for recycling to the acidulation step (step 16) and/or the pressure oxidation step (step 18). In the CCD wash step 26, wash water is applied to the thickened oxidized concentrate slurry 25 to form an underflow stream 27 of washed oxidized concentrate slurry and an overflow stream of acid-containing solution 30 which has been diluted in comparison with the overflow stream 32, comprising a solution of acid and dissolved metal sulfates/arsenates. The CCD wash step 26 involves the removal of acid and dissolved metal sulfates/arsenates in multiple thickeners by applying clean water wash. The amount of dissolved metal sulfates/arsenates in the underflow stream 27 of washed oxidized concentrate slurry (as well as in the first washed slurry/solid 29) should be preferably kept to a minimum, because any dissolved ferric iron ($Fe^{3+}$) and dissolved pentavalent arsenate ($As^{5+}$) will consume sulfur dioxide during the subsequent reductive leach step (step 36). The filter and wash step 28 can be one or more of a number of conventional filtration and washing techniques for filtering and washing slurry/solids. In the filter and wash step (step 28), the underflow stream 27 of the washed oxidized concentrate slurry undergoes filtration and/or wash to further reduce the amount of dissolved metal sulfates/arsenates. Optionally, re-pulping of the filter cake may be included as well between filtrations to further improve wash efficiency. The filtrate stream 31 from the filter and wash step 28 is acid-containing solution, which is diluted in comparison with the overflow stream 32.

In the above embodiment, the first solid/liquid separation and wash step 23 forms an underflow (solid) stream 29 of first washed slurry/solid and overflow/filtrate streams (30, 31 and 32) of an acid-containing solution (which also contains dissolved metal sulfates/arsenates). In the preferred embodiment shown in FIG. 1, the first washed slurry/solid 29 stream corresponds to the underflow (or filter cake) stream from the filter and wash step 28.

There are a number of other variations for the solid/liquid separation and wash step 23. These can include, for example, the following options:
Option #1—"CCD wash" only;
Option #2—"Filter and wash" only;
Option #3—"CCD wash"+"Filter and wash";
Option #4—"Thickening"+"CCD wash"; or
Option #5—"Thickening"+"Filter and wash".

The different options and the appropriateness of using such given the circumstances will generally be understood by a person skilled in the art. For instance, when the solid content in the re-dissolved slurry 21 is high, the thickening step 24 may be unnecessary and so can be omitted. Multiple stages of filter and wash may be considered. Also, re-pulping of the filter cake may be included between filtrations to further improve wash efficiency.

The overflow stream 32 from the thickening step 24; the overflow stream 30 from the CCD wash step 26; and the filtrate stream 31 from the filter & wash step 28; all of which consist mostly of process water with acid and dissolved metal sulfates/arsenates in solution, can be recycled, as needed, to the acidulation step 16 and/or to the pressure oxidation step 18, to provide the increased acidity to make the solid arsenic compounds less stable and to serve as a water source therefor for temperature control. The surplus of the overflow/filtrate streams (32, 30 and 31) may undergo a further water treatment step 34, where acid is neutralized and any dissolved metal sulfates/arsenates may be precipitated or recovered, if desired, using any commercially available conventional processes. For example, it may be desirable that dissolved copper be recovered from these overflow/filtrate streams. Again, the treated water from the water treatment step 34 may also be recycled to the acidulation step 16, the pressure oxidation step 18, the CCD wash step 26, the filter and wash step 28, and other steps related to the process including flotation and grinding, and/or as wash water or dilution water in various steps in order to serve as a source of water therefor.

The first washed slurry/solid 29 from the first solid/liquid separation and wash step 23 is then subjected to a reductive leach step 36. Sulfuric acid, sulfur dioxide and water (and optionally, a catalyst of copper, such as copper sulfate) are added (stream 35) to the first washed slurry/solid 29 in a sealed reactor, and reacted with the first washed slurry/solid 29 under moderately elevated temperatures and total pressure (see below for suitable reaction conditions) to reduce ferric iron ($Fe^{3+}$) and pentavalent arsenic ($As^{5+}$) in the solid to form soluble ferrous iron ($Fe^{2+}$)(such as ferrous sulfate $FeSO_4$) and soluble trivalent arsenic ($As^{3+}$)(such as arsenous acid, $H_3AsO_3$) in solution, respectively. Any sulfates, which are associated with ferric iron ($Fe^{3+}$) and pentavalent arsenic ($As^{5+}$) in the solid, will be dissolved into solution as well after ferric iron ($Fe^{3+}$) and pentavalent arsenic ($As^{5+}$) in the solid are reduced to ferrous iron ($Fe^{2+}$) and trivalent arsenic ($As^{3+}$). In general, hematite $Fe_2O_3$, jarosite $MFe_3(OH)_6(SO_4)_2$, residual basic ferric sulfate $FeOHSO_4$, scorodite $FeAsO_4 \cdot 2H_2O$, and any basic iron arsenate sulfate $Fe_x(OH)_y(SO_4)_z(AsO_4)_m \cdot nH_2O$, etc., will all be broken down. The added sulfur dioxide is oxidized to sulfate or sulfuric acid during this reductive leach step 36.

Assuming arsenic in the solid is present as basic iron arsenate sulfate (which for example may be expressed as $Fe_6(SO_4)_3(AsO_4)_2(OH)_6 \cdot nH_2O$), the reductive reaction may be expressed as:

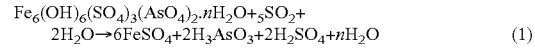

$$Fe_6(OH)_6(SO_4)_3(AsO_4)_2 \cdot nH_2O + 5SO_2 + 2H_2O \rightarrow 6FeSO_4 + 2H_3AsO_3 + 2H_2SO_4 + nH_2O \quad (1)$$

The reductive reactions for scorodite $FeAsO_4 \cdot 2H_2O$ may be expressed in the following:

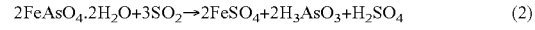

$$2FeAsO_4 \cdot 2H_2O + 3SO_2 \rightarrow 2FeSO_4 + 2H_3AsO_3 + H_2SO_4 \quad (2)$$

The reductive reactions for hematite $Fe_2O_3$, jarosite $MFe_3(OH)_6(SO_4)_2$ and basic ferric sulfate $FeOHSO_4$ may be expressed in the following:

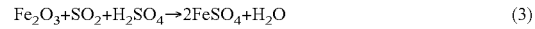

$$Fe_2O_3 + SO_2 + H_2SO_4 \rightarrow 2FeSO_4 + H_2O \quad (3)$$

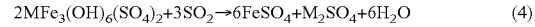

$$2MFe_3(OH)_6(SO_4)_2 + 3SO_2 \rightarrow 6FeSO_4 + M_2SO_4 + 6H_2O \quad (4)$$

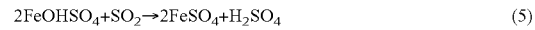

$$2FeOHSO_4 + SO_2 \rightarrow 2FeSO_4 + H_2SO_4 \quad (5)$$

Suitable reaction conditions for this reductive leach step 36 are: a temperature of from about 50 to about 150° C.; total pressure of from about 5 to about 150 psig, a sulfur dioxide partial pressure of from about 1 to about 150 psi; and reaction time of from about 1 to about 10 hours. Preferably, the reaction conditions for this reductive leach step 36 are: a temperature of from about 70 to about 100° C.; total pressure of from about 1 to about 30 psig, a sulfur dioxide partial pressure of from about 1 to about 30 psi; and reaction time of from about 3 to about 6 hours. In this reductive leach step 36, over about 80% of solid arsenic compounds in the first washed slurry/solid 29 can be dissolved into solution. In addition to the dissolution of solid arsenic compounds, the majority of other arsenic-free compounds such as hematite ($Fe_2O_3$) and jarosite ($MFe_3(OH)_6(SO_4)_2$), etc., in the solid, are also dissolved during this reductive leach step 36.

This reductive leach process 36, particularly when considered in combination with the process steps applied to destabilize solid arsenic compounds formed during the pressure oxidation step 18 and to re-dissolve some of the solid arsenic compounds in the solid during the arsenic re-dissolution step 22, as described herein, is not conventionally applied to the processing of arsenic-bearing gold materials or gold concentrates. As mentioned previously, it is generally preferable to keep the amount of dissolved metal sulfates/arsenates in the underflow stream 27 of washed oxidized concentrate slurry, and in the first washed slurry/solid 29 to a minimum, since any dissolved ferric iron ($Fe^{3+}$) and dissolved pentavalent arsenate ($As^{5+}$) will consume sulfur dioxide (thus adding to the cost and potentially adding to the processing time/requirements). This approach of destabilization, re-dissolution and adequate washing in respect of the arsenic (and arsenate) also serves to keep the consumption of sulfur dioxide low during the reductive leach step 36. Preferably, the pulp density of reductive leach is chosen such that the dissolved arsenic in the solution is always below its solubility limit in solution. Arsenic trioxide ($As_2O_3$) may occasionally be present in the solid phase or may precipitate out of the solution after discharge, especially when temperature drops, a wash to the filter cake or a re-pulping of the filter cake using clean water, preferably using hot or warm clean water can be applied.

This reductive leach step 36 may form a vent gas 38 (which may comprise sulfur dioxide that is vented to a sulfur dioxide scrubber) and a leached concentrate slurry 37. Venting of the off-gas from the reductive leach step 36 will be necessary when less than 100% pure sulfur dioxide is added to the reactor(s). The sulfur dioxide bearing vent gas 38 will also occur when the slurry is discharged out of the reactor(s), and the amount of vent gas may be reduced when cooling and/or purging using an inert gas such as nitrogen is provided to the slurry before discharge. To minimize or eliminate venting when either 100% pure sulfur dioxide or less than 100% pure sulfur dioxide is added to the reactor(s), the added sulfur dioxide must be adequately sheared and dispersed into the solution/slurry, and the sulfur dioxide in the gas phase must be sufficiently re-entrained into the solution/slurry through appropriately designed reactor(s), baffles, spargers and agitators. The solid in the leached concentrate slurry 37 contains primarily silicates, other inert gangues, and a very low level of arsenic. If lead is present, lead sulfate may be expected in the solid. Small amounts of other compounds, such as gypsum, may be present as well. Gold remains in the solid without any loss during the reductive leach step 36; any silver, and any platinum group elements like platinum and palladium, also remain in the solid without loss during the reductive leach step 36.

The leached concentrate slurry 37, which generally contains ferrous sulfate ($FeSO_4$), trivalent arsenic ($H_3AsO_3$ and other arsenite compounds) and acid ($H_2SO_4$), etc., in the solution, is then treated in a second solid/liquid separation and wash step 39. When appropriate, cooling may be applied to the hot slurry before this second solid/liquid separation and wash step 39. This second solid/liquid separation and wash step 39 also comprises at least one of several conventional techniques for facilitating the separation of a slurry into solids and a solution and for washing of the resultant solids (as described above in relation to the first liquid/solid separation and wash step 23). As shown in the preferred embodiment of FIG. 1, the second solid/liquid separation and wash step 39 can comprise: a thickening step 40; a counter current decantation (CCD) wash step 42; and a filter and wash step 44.

In the thickening step 40, the leached concentrate slurry 37 is thickened to form a thickened leached concentrate slurry 41 and an overflow stream of acid containing solution 46. The thickening step 40 improves the wash efficiency of the subsequent CCD wash step (step 42) and also recovers a portion of the acid in solution, dissolved arsenic and dissolved metal sulfates for recycling to the acidulation step (step 16) and/or the pressure oxidation step (step 18). In the CCD wash step 42, wash water is applied to the thickened leached concentrate slurry 41 to form an underflow stream 43 of washed thickened slurry/solid and an overflow stream 47 of acid-containing solution. The CCD wash step 42 involves the removal of acid, dissolved arsenic and dissolved metal sulfates in multiple thickeners by applying clean water wash. In the filter & wash step (step 44), the underflow stream 43 of washed thickened slurry/solid can undergo filtration and/or wash to further reduce the amount of acid, dissolved arsenic and dissolved metal sulfates; the filtrate stream 48 from the filter and wash step 44 is acid-containing solution.

The overflow streams 46 and 47 contain primarily ferrous sulfate $FeSO_4$, trivalent arsenic ($H_3AsO_3$ and other arsenite compounds), sulfuric acid $H_2SO_4$, and a small amount of dissolved sulfur dioxide $SO_2$ (or sulfurous acid $H_2SO_3$).

The washed thickened slurry/solid 43 is then subject to a filter and wash step 44, which comprises at least one of a number of conventional filtering and washing techniques for washing the washed thickened slurry/solid 43, to form an acid-containing solution 48 and a second washed slurry/solid 45. Multiple stages of filter and wash may be considered. Also, re-pulping of the filter cake may be included between filtrations to further improve wash efficiency.

As mentioned above, and as shown in FIG. 1, the arsenic-bearing acid-containing solutions 46, 47 and 48 from the second solid/liquid separation and wash step 39 following the reductive leach step 36 are preferably recycled to the acidulation step 16 and/or to the pressure oxidation step 18, generally to help oxidize trivalent arsenic ($As^{3+}$) to pentavalent arsenic ($As^{5+}$) and oxidize ferrous iron ($Fe^{2+}$) to ferric iron ($Fe^{3+}$), because it is desirable to have pentavalent arsenic and ferric iron when the process water is treated for better stability of the resultant solid precipitate. Alternatively, despite being less desirable in terms of capital and operating costs, these trivalent arsenic and ferrous iron bearing acid-containing solutions 46, 47 and 48 can be oxidized and treated separately. Another alternative is to partially or nearly completely oxidize these trivalent arsenic and ferrous iron bearing acid-containing solution streams 46, 47 and 48 in a separate circuit and then recycle them to the acidulation step 16 and/or to the pressure oxidation step 18, to avoid any undesirable effects which may occur during acidulation step 16 and/or pressure oxidation step 18 when a large amount of trivalent arsenic ($As^{3+}$) and ferrous iron ($Fe^{2+}$) is present in the solution/slurry.

The possible variations as described above for the first solid/liquid separation step 23, are also applicable for the second solid/liquid separation and wash step 39, including the following options:

Option #1—"CCD wash" only;
Option #2—"Filter and wash" only;
Option #3—"CCD wash"+"Filter and wash";
Option #4—"Thickening"+"CCD wash"; or
Option #5—"Thickening"+"Filter and wash".

The different options and the appropriateness of using such given the circumstances will generally be understood by a person skilled in the art. Multiple stages of filter and wash may be considered. Also, re-pulping of the filter cake may be included between filtrations to further improve wash efficiency.

The second washed slurry/solid 45 may then be subjected to an optional surface cleaning step 50. This surface cleaning step 50 may not be required, for example, where the product low arsenic-bearing gold concentrate is to be sold to a smelter for further processing. However, where the product low arsenic-bearing gold concentrate 52 is to be hydrometallurgically processed further (such as leaching using sodium cyanide), this surface cleaning step 50 will be necessary to enhance gold leach rate and increase gold recovery. One suitable possibility for the surface cleaning step 50 involves treating the second washed slurry/solid 45 with hydrogen peroxide (or another oxidizing agent like ozone or hypochlorite), at ambient temperature or slightly elevated temperature, after the second washed slurry/solid 45 is re-pulped or diluted. When hydrogen peroxide is used, acidic conditions are generally preferred in order to ensure the stability of hydrogen peroxide. Another effective surface cleaning method may be achieved through regrinding of the second washed slurry/solid 45 prior to gold leaching.

The product of the foregoing is a low arsenic-bearing gold concentrate 52. In comparison with the input arsenic-bearing gold concentrate 12, this low arsenic-bearing gold concentrate 52 will contain substantially less arsenic content; in addition, there will have been a substantial reduction in mass in terms of the amount of solid material involved. The low arsenic-bearing gold concentrate 52 can undergo further processing/refinement to extract the gold content (or any silver content or platinum group elements, as the case may be); these will generally be in the nature of conventional gold extraction processes, including, for example, pyrometallurgical processes (such as smelting/roasting) and leach treatment with cyanide or other lixiviants (such as thiosulfate, thiocyanate, chloride, bromide, hypochlorite, thiourea, glycine, etc. (including, more specifically, sodium cyanide, calcium thiosulfate, ammonium thiosulfate, sodium chloride/hydrochloric acid)).

EXAMPLE

A high arsenic-bearing gold concentrate was processed in accordance with the disclosed process. Samples were collected from certain of the individual steps in the process, and assays were conducted. The starting input was a high arsenic-bearing gold concentrate 12 having ~38 grams of gold per tonne of solid material, which contained 35% sulfide sulfur and 15% arsenic by weight (for the purpose of illustration, this would constitute 1 tonne of raw solid material). Following the steps of: acidulation 16, pressure oxidation 18, arsenic re-dissolution 22, and first solid/liquid separation & wash 23 (i.e. thickening 24, CCD wash 26 and filter and wash 28), the solid of the underflow of the first washed slurry/solid 29 was found to contain 12% arsenic by weight, along with about 67% mass reduction of the solid compared with the solid from the initial concentrate 12. Although the reduction in arsenic by weight initially appears relatively moderate, it should be borne in mind that this was accompanied by a sizable mass reduction (about 67%) in the solid material, down to ⅓ of the starting mass; this means that the solid of the first washed slurry/solid 29 had an overall gold concentration of ~114 grams of gold per tonne of solid material. Following the further steps of: reductive leach 36, and second solid/liquid separation & wash 39, the product low arsenic-bearing gold concentrate 52 was found to contain less than 0.5% arsenic by weight. At the same time, there had been a corresponding further mass reduction of about 67% calculated on the basis of the solid stream of the first washed slurry/solid 29, or about 22% calculated on the basis of the solid stream of the high arsenic-bearing gold concentrate 12, which meant the gold concentration of the product material was about 342 grams of gold per tonne of solid material.

The invention claimed is:

1. A process for reducing arsenic content in an arsenic-bearing sulfidic gold concentrate, comprising:
    subjecting an aqueous slurry of the gold concentrate to a pressure oxidation step, wherein the aqueous slurry of the gold concentrate is reacted with oxygen and an acid in an autoclave at an oxidizing pressure and at an oxidizing temperature, to form an oxidized concentrate slurry;
    subjecting the oxidized concentrate slurry to an arsenic re-dissolution step, wherein the oxidized concentrate slurry is discharged from the autoclave and maintained for 1 to 10 hours at a temperature in a range of from 50° C. to 100° C. to form a re-dissolved slurry;
    subjecting the re-dissolved slurry to a first solid/liquid separation and wash step, wherein the first solid/liquid separation and wash step comprises at least one technique for facilitating the separation of a slurry into solids and a solution, and washing the resultant solids, to form a first washed slurry/solid and at least one first acid-containing solution;
    subjecting the first washed slurry/solid to a reductive leach step, wherein the first washed slurry/solid is reacted with sulfur dioxide for from 1 hour to 10 hours, at a temperature of from 50° C. to 150° C., at a total pressure of from 1 psig to 150 psig, and a partial pressure of sulfur dioxide from 1 psi to 150 psi, to form a leached concentrate slurry; and
    subjecting the leached concentrate slurry to a second solid/liquid separation and wash step, wherein the second solid/liquid separation and wash step is one of a number of techniques for facilitating the separation of a slurry into solids and a solution, and washing the resultant solids, to form a second washed slurry/solid and at least one second acid-containing solution, wherein the second washed slurry/solid is a low arsenic-bearing gold concentrate, wherein the low arsenic-bearing gold concentrate contains arsenic in an amount of less than 0.5% by mass.

2. The process of claim 1, wherein prior to the pressure oxidation step, the gold concentrate is subjected to an acidulation step, wherein an acid is added to the aqueous slurry of the gold concentrate, to form an acidulated concentrate slurry.

3. The process of claim 2, wherein in the acidulation step, the acid is concentrated sulfuric acid or an aqueous solution of sulfuric acid.

4. The process of claim 1, wherein in the pressure oxidation step, the aqueous slurry of the gold concentrate is reacted with the oxygen and acid for from 30 minutes to 120 minutes in the autoclave, and wherein the oxidizing pressure is in a range of from 200 psig to 600 psig total pressure, wherein the oxidizing pressure is in a range of from 15 psi to 250 psi partial pressure of oxygen, and the oxidizing temperature is in a range of from 200° C. to 240° C.

5. The process of claim 4, wherein in the pressure oxidation step, the aqueous slurry of the gold concentrate is reacted with the oxygen and acid for from 60 minutes to 90 minutes in the autoclave, and wherein the oxidizing pressure is in a range of from 430 psig to 530 psig total pressure, wherein the oxidizing pressure is in a range of from 25 psi to 100 psi partial pressure of oxygen, and the oxidizing temperature is in a range of from 220° C. to 230° C.

6. The process of claim 1, wherein the first solid/liquid separation and wash step, comprises one or more of: a thickening step, to form an underflow stream of thickened oxidized concentrate slurry and an overflow stream of a first acid-containing solution, wherein the first acid-containing solution also contains dissolved arsenate; a countercurrent decantation wash step, to form an underflow stream of washed oxidized concentrate slurry and an overflow stream of a first acid-containing solution, wherein said acid-containing solution also contains dissolved arsenates; and a filter and wash step, to form the first washed slurry/solid and a filtrate stream of a first acid-containing solution.

7. The process of claim 1, wherein the first solid/liquid separation and wash step comprises: a thickening step; a countercurrent decantation wash step; and a filter and wash step.

8. The process of claim 2, wherein at least one of the at least one acid-containing solutions from the first solid/liquid separation and wash step is recycled to the acidulation step and/or to the pressure oxidation step.

9. The process of claim 1, wherein in the reductive leach step, the first washed slurry/solid is reacted with sulfur dioxide, and at least one of sulfuric acid and water.

10. The process of claim 1, wherein in the reductive leach step, the first washed slurry/solid and sulfur dioxide are reacted together for from 3 hours to 6 hours, at a temperature of from 70° C. to 100° C., at a total pressure of from 1 psig to 30 psig, and a partial pressure of sulfur dioxide of from 1 psi to 30 psi.

11. The process of claim 1, wherein in the reductive leach step, a catalyst of copper sulfate is added to enhance the reaction rate.

12. The process of claim 1, wherein the second solid/liquid separation and wash step, comprises one or more of: a thickening step, to form an underflow stream of thickened leached concentrate slurry and an overflow stream of a second acid-containing solution; a countercurrent decantation wash step, to form an underflow stream of washed thickened slurry/solid and an overflow stream of a second acid-containing solution; and a filter and wash step, to form the second washed slurry/solid and an filtrate stream of a second acid-containing solution.

13. The process of claim 1, wherein the second solid/liquid separation and wash step comprises: a thickening step; a countercurrent decantation wash step; and a filter and wash step.

14. The process of claim 2, wherein the at least one second acid-containing solution from the second solid/liquid separation and wash step is recycled to the acidulation step and/or to the pressure oxidation step.

15. The process of claim 1, wherein before the pressure oxidation step, the gold concentrate undergoes mechanical regrinding in a regrinding step.

16. The process of claim 1, wherein following the second solid/liquid separation and wash step, the second washed slurry/solid is subjected to a surface cleaning step, selected from treatment with an oxidizing agent, treatment by extended aeration, and treatment by regrinding, to form the low arsenic-bearing gold concentrate.

17. The process of claim 16, wherein the oxidizing agent is selected from the group consisting of hydrogen peroxide, ozone, pure oxygen, and hypochlorite.

18. The process of claim 1, wherein the low arsenic-bearing gold concentrate is leach treated with a lixiviant to extract the gold.

19. The process of claim 18, wherein the lixiviant is selected from the group consisting of sodium cyanide, calcium thiosulfate, ammonium thiosulfate, a mixture of sodium chloride and hydrochloric acid, and glycine.

* * * * *